United States Patent
Ling et al.

(10) Patent No.: US 10,095,363 B2
(45) Date of Patent: Oct. 9, 2018

(54) CAPACITIVE SENSING WITH HIGH PASS FILTERING FOR SEGMENTATION

(71) Applicant: SYNAPTICS INCORPORATED, San Jose, CA (US)

(72) Inventors: Yi Ling, Redwood City, CA (US); Sanjay Mani, Los Altos Hills, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/083,184

(22) Filed: Mar. 28, 2016

(65) Prior Publication Data

US 2017/0277293 A1    Sep. 28, 2017

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC .... G06F 3/044; G06F 3/0488; G06F 3/04883; G06F 3/041
See application file for complete search history.

(56) References Cited

U.S. PATENT DOCUMENTS

| | | | |
|---|---|---|---|
| 8,493,356 B2 | 7/2013 | Joharapurkar et al. | |
| 8,508,504 B2 | 8/2013 | Mo | |
| 8,536,880 B2 | 9/2013 | Philipp | |
| 8,766,944 B2 | 7/2014 | Ksondzyk | |
| 8,941,394 B2 | 1/2015 | Martin et al. | |
| 8,947,373 B2 | 2/2015 | Kremin et al. | |
| 8,970,229 B2 | 3/2015 | Philipp | |
| 9,128,570 B2 | 9/2015 | Vallis et al. | |
| 2009/0109195 A1* | 4/2009 | Kent ...................... | G06F 3/045 345/178 |
| 2009/0303203 A1 | 12/2009 | Yilmaz et al. | |
| 2010/0044122 A1 | 2/2010 | Sleeman et al. | |
| 2010/0172510 A1 | 7/2010 | Juvonen | |
| 2011/0080365 A1* | 4/2011 | Westerman ........... | G06F 3/0418 345/173 |
| 2011/0134076 A1 | 6/2011 | Kida et al. | |
| 2011/0254802 A1 | 10/2011 | Philipp | |
| 2012/0256638 A1 | 10/2012 | Van Antwerpen | |
| 2012/0326734 A1 | 12/2012 | Cho et al. | |
| 2013/0321332 A1 | 12/2013 | Yoshimura | |
| 2014/0267080 A1* | 9/2014 | Vandermeijden ..... | G06F 3/0418 345/173 |
| 2014/0267143 A1 | 9/2014 | Worfolk et al. | |
| 2015/0015539 A1* | 1/2015 | Fotopoulos ........... | G06F 3/0416 345/174 |
| 2015/0054772 A1 | 2/2015 | Jain et al. | |

\* cited by examiner

*Primary Examiner* — Olga Merkoulova
(74) *Attorney, Agent, or Firm* — Paradice and Li LLP

(57) ABSTRACT

Embodiments described herein include a method for using multiple filtered images. The method includes acquiring changes of capacitance in a sensing region at a plurality of sensor electrodes in a capacitive sensor. The method also includes generating a capacitive frame based on the changes of capacitance and calculating one or more filtered capacitive frames by modifying the capacitive frame with a spatial filter. The method also includes performing clump detection on the one or more filtered capacitive frames, where clump detection includes detecting locations in each filtered capacitive frame exceeding a first threshold near locations that exceed a second threshold in the corresponding capacitive frame.

20 Claims, 8 Drawing Sheets

CAPACITIVE SENSING WITH HIGH PASS FILTERING FOR SEGMENTATION

BACKGROUND

Field of the Disclosure

Embodiments of the present invention generally relate to a method and apparatus for touch sensing, and more specifically, to processing a received signal.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Embodiments described herein include a processing system for a capacitive sensing device, the processing system including a filter configured to modify a capacitive frame by calculating one or more filtered capacitive frames corresponding to the capacitive frame. The processing further also includes a segmentation module configured to detect locations in each filtered capacitive frame exceeding a first threshold near locations that exceed a second threshold in the corresponding capacitive frame. The processing system further includes a classifier configured to classify one or more detected locations in the filtered capacitive frames.

In another embodiment, an input device includes a plurality of capacitive sensing electrodes configured to receive a signal. The input device also includes a processing system coupled to the plurality of capacitive sensing electrodes. The processing system includes a filter configured to modify a capacitive frame by calculating one or more filtered capacitive frames corresponding to the capacitive frame. The processing system also includes a segmentation module configured to detect locations in each filtered capacitive frame exceeding a first threshold near locations that exceed a second threshold in the corresponding capacitive frame. The processing system includes a classifier configured to classify one or more detected locations in the filtered capacitive frames.

In another embodiment, a method for operating an input device includes acquiring changes of capacitance in a sensing region at a plurality of sensor electrodes in a capacitive sensor. The method also includes generating a capacitive frame based on the changes of capacitance. The method includes calculating one or more filtered capacitive frames by modifying the capacitive frame, where at least one filtered capacitive frame is modified with a high pass spatial filter. The method also includes performing clump detection on the one or more filtered capacitive frames, where clump detection includes detecting locations in each filtered capacitive frame exceeding a first threshold near locations that exceed a second threshold in the corresponding capacitive frame.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
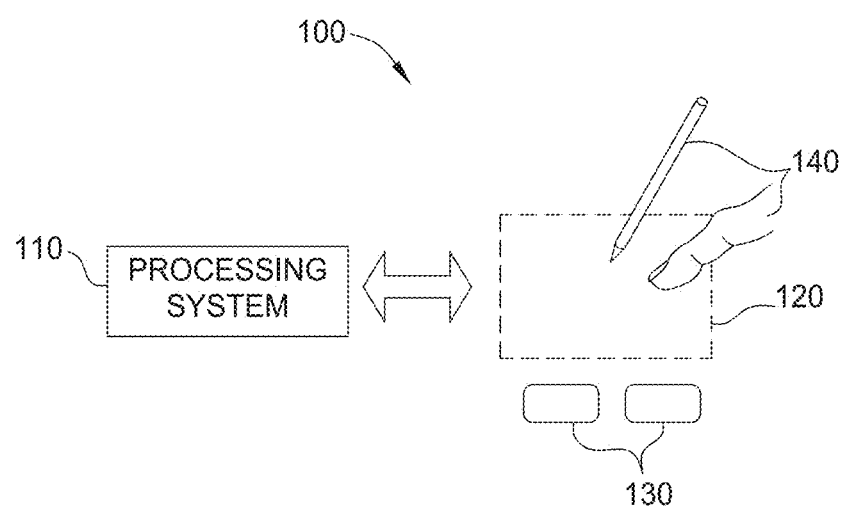
FIG. 1 is a block diagram of a system that includes an input device according to an embodiment.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously provide techniques for detecting and/or compensating for various noises and distortions of a touch sensor device. For example, a sensor may bend under pressure from the touch of a palm or a first on the sensor. Other noises, such as display noise, may alter the baseline of a sensor image. The baseline is the signal that is always present even when no object is touching the sensor. Noise may affect the baseline from frame to frame or from sensor row to sensor row in the same frame. In such cases, normal baseline subtraction may not reliably remove the baseline. The noise could thus lead to missing touches or detecting touches that have not occurred (ghost touches). Embodiments described herein use information from one or more filtered images to segment the image. The information from the filtered image is less susceptible to corruption due to sensor bending or other low frequency noise sources. In addition, points of inflection may be used for clump detection and circumscribing.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
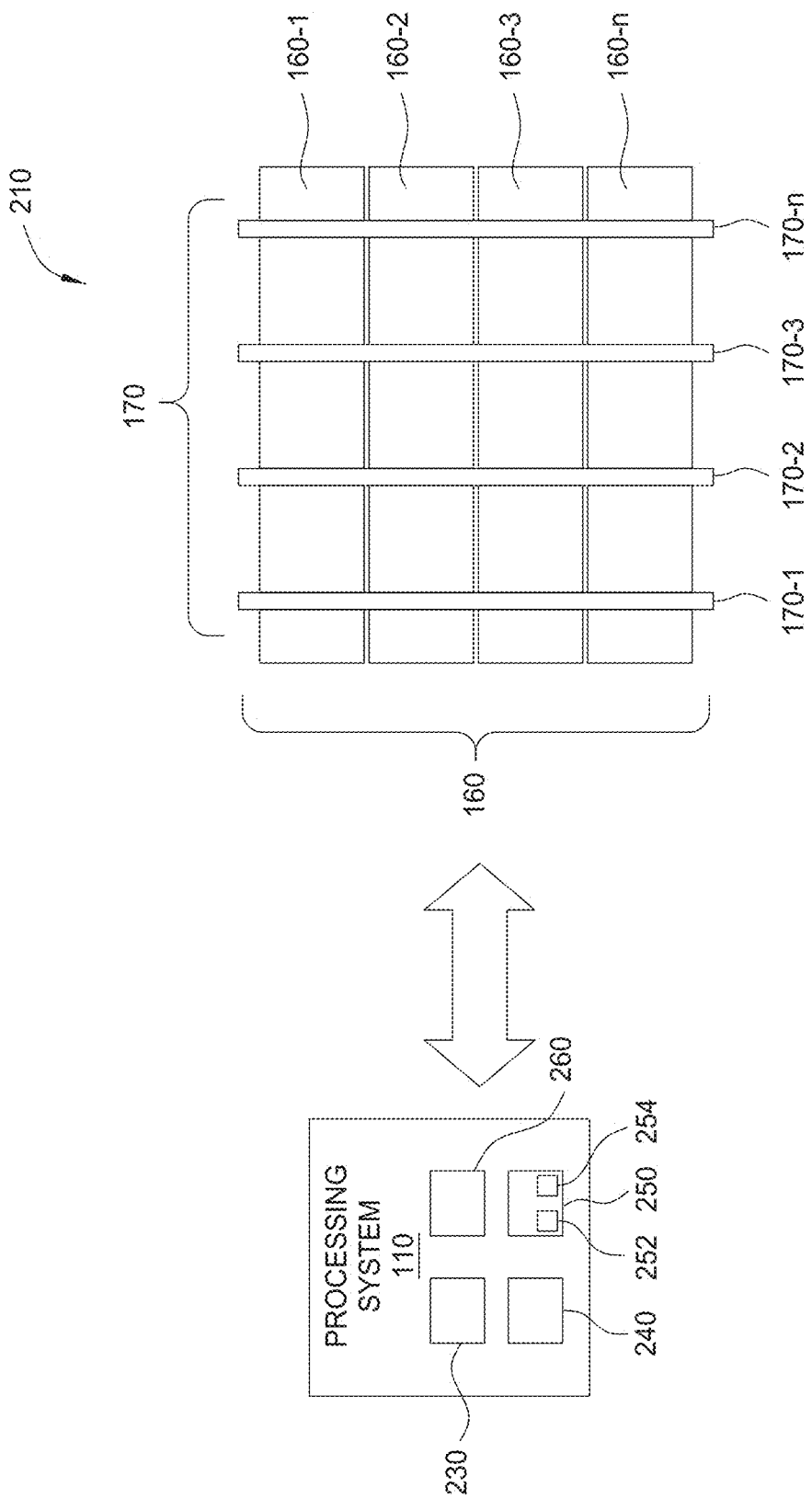
FIG. 2 is an example sensor electrode pattern according to an embodiment.

FIG. 2 illustrates a system 200 including a processing system 110 and a portion of an example sensor electrode pattern configured to sense in a sensing region associated with the pattern, according to some embodiments. For clarity of illustration and description, FIG. 2 shows a pattern of simple rectangles illustrating sensor electrodes, and does not show various components. This sensor electrode pattern comprises a first plurality of sensor electrodes 160 (160-1, 160-2, 160-3, . . . 160-n), and a second plurality of sensor electrodes 170 (170-1, 170-2, 170-3, . . . 170-n) disposed over the plurality of sensor electrodes 160.

Sensor electrodes 160 and sensor electrodes 170 are typically ohmically isolated from each other. That is, one or more insulators separate sensor electrodes 160 and sensor electrodes 170 and prevent them from electrically shorting to each other. In some embodiments, sensor electrodes 160 and sensor electrodes 170 are separated by insulative material disposed between them at cross-over areas; in such constructions, the sensor electrodes 160 and/or sensor electrodes 170 may be formed with jumpers connecting different portions of the same electrode. In some embodiments, sensor electrodes 160 and sensor electrodes 170 are separated by one or more layers of insulative material. In some other embodiments, sensor electrodes 160 and sensor electrodes 170 are separated by one or more substrates; for example, they may be disposed on opposite sides of the same substrate, or on different substrates that are laminated together.

In other embodiments, one or more of sensor electrodes 160 or 170 are disposed on the same side or surface of the common substrate and are isolated from each other in the sensing region 120. The sensor electrodes 160 and 170 may be disposed in a matrix array where each sensor electrode may be referred to as a matrix sensor electrode. Each sensor electrode may be substantially similar size and/or shape. In one embodiment, one or more of sensor electrodes of the matrix array of sensor electrodes 160 and 170 may vary in at least one of size and shape. Each sensor electrode of the matrix array may correspond to a pixel of a capacitive image. Further, two or more sensor electrodes of the matrix array may correspond to a pixel of a capacitive image. In various embodiments, each sensor electrode of the matrix array may be coupled to a separate capacitive routing trace of a plurality of capacitive routing traces. In various embodiments, the sensor electrodes 160 or 170 comprise one or more grid electrodes disposed between at least two sensor electrodes. The grid electrode and at least one sensor electrode may be disposed on a common side of a substrate, different sides of a common substrate and/or on different substrates. In one or more embodiments, the sensor electrodes and the grid electrode(s) may encompass an entire voltage electrode of a display device. Although the sensor electrodes may be electrically isolated on the substrate, the electrodes may be coupled together outside of the sensing region 120—e.g., in a connection region. In one embodiment, a floating electrode may be disposed between the grid electrode and the sensor electrodes. In one particular embodiment, the floating electrode, the grid electrode and the sensor electrode comprise the entirety of a common electrode of a display device.

The areas of localized capacitive coupling between sensor electrodes 160 and sensor electrodes 170 may be termed "capacitive pixels." The capacitive coupling between the sensor electrodes 160 and sensor electrodes 170 change with the proximity and motion of input objects in the sensing region associated with the sensor electrodes 160 and sensor electrodes 170.

In some embodiments, the sensor pattern is "scanned" to determine these capacitive couplings. That is, the sensor electrodes 160 are driven to transmit transmitter signals. Transmitters may be operated such that one sensor electrode transmits at one time, or multiple sensor electrodes transmit at the same time. Where multiple sensor electrodes transmit simultaneously, these multiple sensor electrodes may transmit the same transmitter signal and effectively produce an effectively larger sensor electrode, or these multiple sensor electrodes may transmit different transmitter signals. For example, multiple sensor electrodes may transmit different transmitter signals according to one or more coding schemes that enable their combined effects on the resulting signals of sensor electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, sensor electrodes 160 comprise one or more common electrodes (e.g., "V-com electrode") used in updating the display of the display screen. These common electrodes may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each sensor electrode 160 comprises one or more common electrodes. In other embodiments, at least two sensor electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g., combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats.

Processing system 110 may include a driver module 230, a sensor module 240, a determination module 250, and an optional memory 260. The processing system 110 is coupled to sensor electrodes 170 and sensor electrodes 160 through a plurality of conductive routing traces (not shown in FIG. 2).

The sensor module 240, which includes sensor circuitry, is coupled to the plurality of sensor electrodes 170 and configured to receive resulting signals indicative of input (or lack of input) in the sensing region 120 and/or of environmental interference. The sensor module 240 may also be configured to pass the resulting signals to the determination module 250 for determining the presence of an input object and/or to the optional memory 260 for storage. Sensor module 240 may also drive sensor electrodes. In various embodiments, the IC of the processing system 110 may be coupled to drivers for driving the sensor electrodes 160. The drivers may be fabricated using thin-film-transistors (TFT) and may comprise switches, combinatorial logic, multiplexers, and other selection and control logic.

The driver module 230, which includes driver circuitry, included in the processing system 110 may be configured for updating images on the display screen of a display device (not shown). For example, the driver circuitry may include display circuitry and/or sensor circuitry configured to apply one or more pixel voltages to the display pixel electrodes through pixel source drivers. The display and/or sensor circuitry may also be configured to apply one or more common drive voltages to the common electrodes to update the display screen. In addition, the processing system 110 is configured to operate the common electrodes as transmitter electrodes for input sensing by driving transmitter signals onto the common electrodes.

The determination module 250 may include components for segmenting and classifying touch input signals. For example, determination module 250 may include a segmentation module 252 that detects certain touch locations. The determination module 250 may also include a classifier 254 that receives detected clumps and then classifies the clumps as various types of inputs.

The processing system 110 may be implemented with one or more ICs to control the various components in the input device. For example, the functions of the IC of the processing system 110 may be implemented in more than one integrated circuit that can control the display module elements (e.g., common electrodes) and drive transmitter signals and/or receive resulting signals received from the array of sensing elements. In embodiments where there is more than one IC of the processing system 110, communications between separate processing system ICs may be achieved through a synchronization mechanism, which sequences the signals provided to the sensor electrodes 160. Alternatively the synchronization mechanism may be internal to any one of the ICs.

Processing system 110 may also comprise a receiver 270 that interfaces sensors to other components. The receiver 270 may comprise an analog front end (AFE) in some embodiments, and will be referred to as AFE 270 in this example embodiment for convenience. Other receiver implementations may be used in other embodiments. The AFE 270 may be embodied in sensor module 240 or in one or more other components of processing system 110.

Embodiments described herein provide techniques for touch detection using multiple filtered images. A delta image is received from a capacitive touch sensor. The delta image is filtered with one or more filters to create one or more filtered image frames. Then, the filtered images, in combination with the delta image, are used to detect touch locations. A high pass spatial filter is used in some embodiments to create filtered image frames. In other embodiments, low pass filters or other types of filters may be used to create the filtered images.

Figure 3:
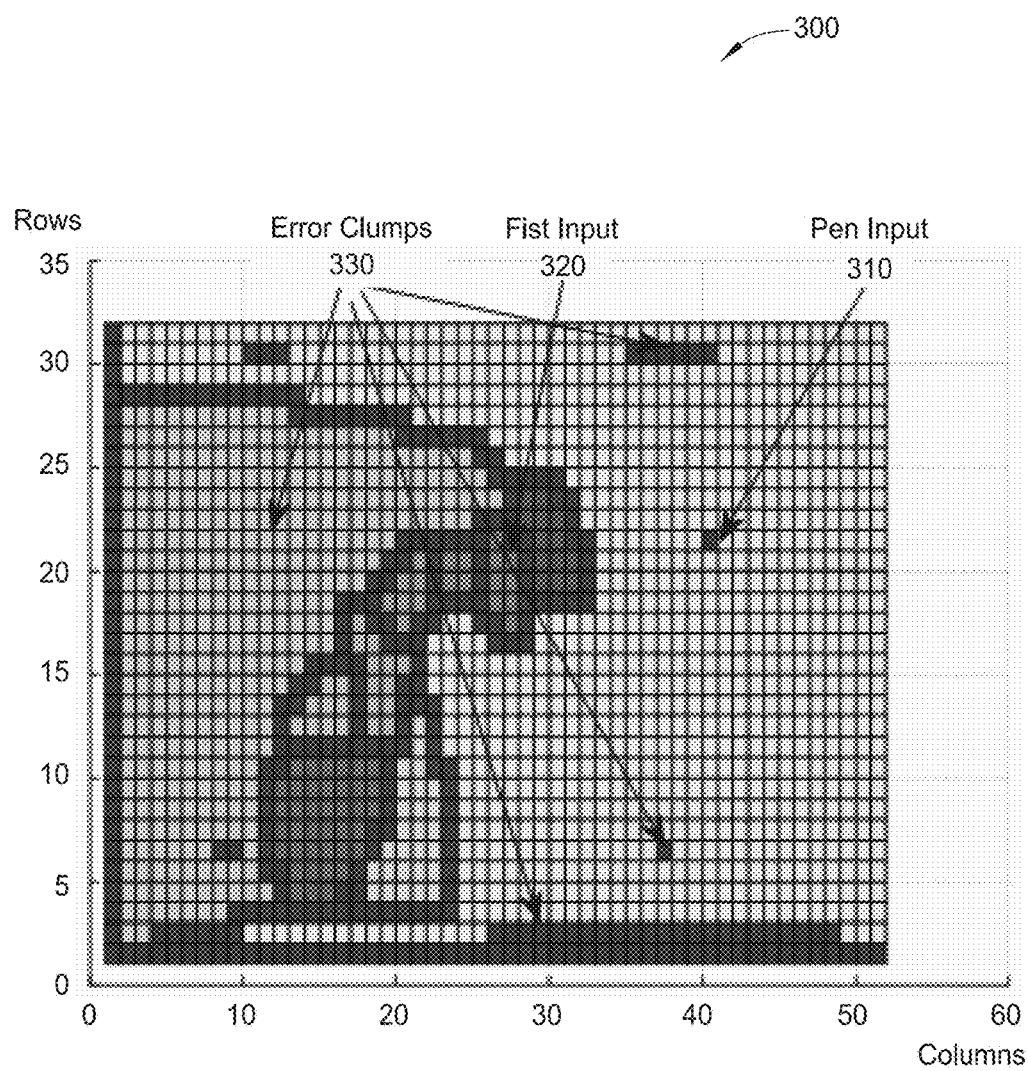
FIG. 3 illustrates an example top view of a touch sensor image before filtering.

FIG. 3 illustrates an example top view 300 of a touch sensor image before filtering. View 300 illustrates a simplified model of a touch sensor with rows and columns of pixels, with each pixel represented by a rectangle on the graph. As shown, one of the pixels registered an input 310 from a pen, while another group of pixels registered an input 320 from a first resting on the touch sensor. Error clumps 330 are also shown on the touch sensor image. These error clumps may result from bending, display noise, ghost touches, or any other type of error. This model illustrates the touch sensor image before any processing is done on the image. Further steps, as described below, determine errors from non-error inputs, and then classify the non-error inputs (e.g., differentiate a pen input from a first or a finger touch).

For proper touch detection, it is important to detect or compensate for distortion. Often, low spatial frequency distortion needs to be filtered. Depending on the spatial frequency profile, multiple filters may be needed.

As mentioned above, a baseline signal is a signal that is present on a touch sensor when nothing is touching the sensor. The baseline signal can be affected by grounding, thermal noise, or other variations. When an image is estimated, the processing system estimates the difference between the signal added by the finger (or pen) touching the sensor and the baseline signal. Standard detection techniques are based on a threshold. A threshold level is set based on analog properties of the sensor. If a pixel exceeds the threshold, that pixel is considered to be registering a touch.

To properly register a touch, a bending signal for a frame should be accounted for. In other words, a finger, pen, or first that touches a touch screen may cause some amount of physical bending of the sensor. In addition, bending may occur due to mechanical imperfections of a touch sensor. One solution to account for this bending is to estimate the bending signal for each frame and then subtract the bending signal from the touch sensor image. The compensated image can then be used for further detection. The quality of the detection depends on the accuracy of the estimate of the bending. However, the accuracy of the bending estimation depends on coarse detection of the signal before compensation. So the bending estimation and the coarse detection of the signal depend on one another, which can create an issue of which one to perform first (a causality issue). In addition, the accuracy of this estimation requires a non-trivial order of polynomial approximation. As the pixel count increases, the computing complexity of the estimation and compensation can be prohibitive (a complexity issue).

Embodiments described herein can perform detection with the bending present. The bending signal does not have to be removed before detection. Changes of capacitance can be acquired with transcapacitive sensing resulting in capacitive frames that are two-dimensional images. Changes of capacitance could also be acquired with absolute capacitive sensing resulting in capacitive frames that are profiles. In either event, filtered images and profiles can be used to detect touches without estimation and compensation for the bending signal. Either high pass filters or low pass filters may be used, depending on the embodiment. An example filter that can detect touches without estimation and compensation is a second order derivative. One example of a second order derivative is a Laplacian operator. The Laplacian can be expressed for discrete space in the form of a z-transform as:

$$1-2*z^{-1}+z^{-2}$$

A two-dimensional version of the Laplacian is simply the sum of the one-dimensional version for the x and y axis. This particular filter is a high pass spatial filter that removes DC (direct current) offset and low frequency noise. One advantage of this filter is that the quality of the filtered image does not depend on the numerical accuracy of the filter implementation.

For each delta transcapacitive image frame to be processed, extra images are created by calculating the two-dimensional second order derivatives of the original frames. For edge pixels, the first order derivative may be used as an alternative. The filtered image frames can then be subject to segmentation and circumscribing processes. In other embodiments, extra images can be calculated with other derivatives besides the second order derivative. For example, some large input signals might use third or fourth order derivatives in accordance with embodiments described herein.

In some embodiments, low frequency noise can be calculated by comparing two or more filtered capacitive frames. Low frequency noise can also be calculated by comparing the capacitive frame to a filtered capacitive frame. A bending amount of the capacitive sensor can also be determined based on comparing two capacitive frames. While bending is one issue in detection that can be reduced using the embodiments described herein, it is to be understood that a variety of other issues may be solved as well, depending on the embodiment.

Figure 4A:
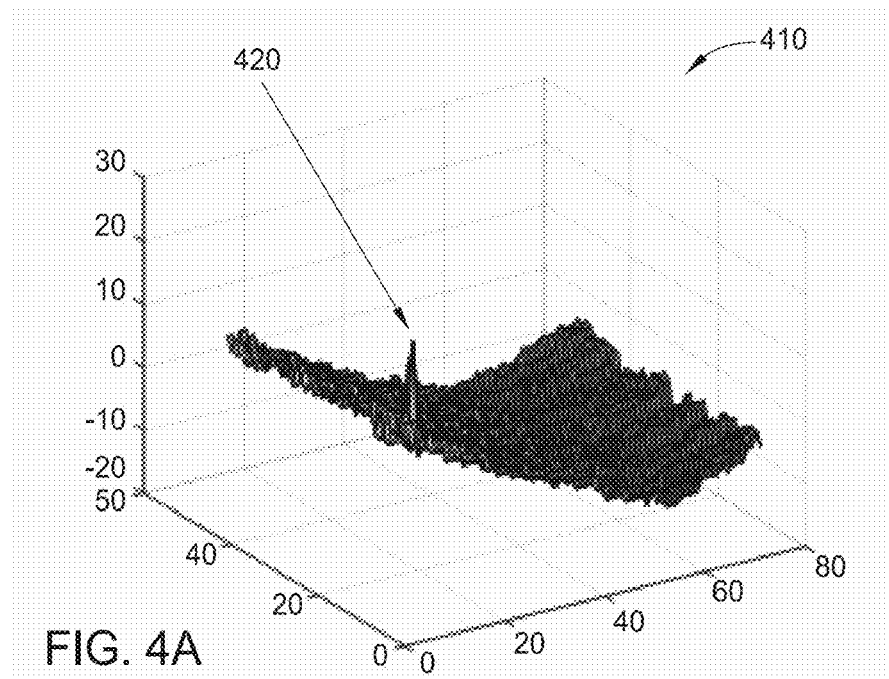
FIG. 4A illustrates a delta transcapacitive image with a pen input.

FIG. 4A illustrates an example delta image 410 according to one embodiment. The delta image 410 illustrated is a two-dimensional image that is the result of a touch input at the touch sensor. Changes of capacitance are acquired in a sensing region at a plurality of electrodes and a capacitive frame, or delta image, is generated. The peak 420 illustrated is the result of a pen input at that specific point of the touch sensor. The bending of the sensor can also be seen in delta image 410 (the delta image 410 curves from left to right). Because of the sensor bending and other noise, the pen input 420 is only slightly higher than other parts of the delta image 410. Because the difference between the pen input 420 and other parts of the delta image 410 is not large, detecting the pen image 420 based on a threshold can be difficult and can result in errors. The delta image 410 can be processed to make detection of the pen input easier. However, instead of performing complicated polynomial fitting to try to remove the bending, embodiments described herein calculate a second-order derivative of the delta image 410.

Figure 4B:
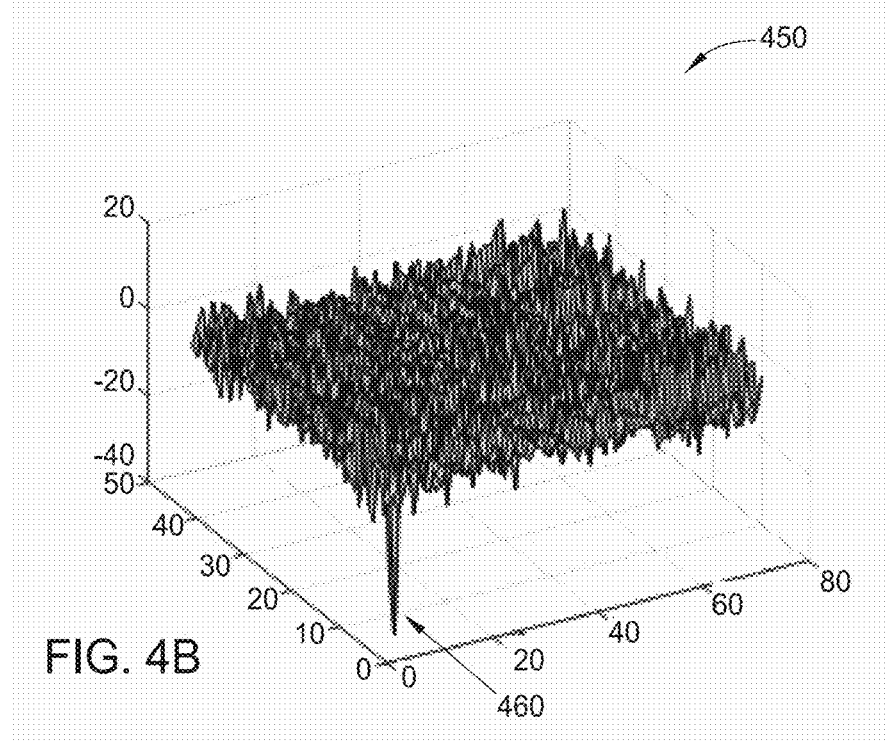
FIG. 4B illustrates a Laplacian of the delta transcapacitive image of FIG. 4A.

FIG. 4B illustrates a filtered capacitive frame 450 created by calculating a second-order derivative (or Laplacian) of the delta image 410. The second-order derivative is a high pass spatial filter applied to the delta image. After this second-order derivative is performed, image processing is done to detect the touch inputs. As seen in FIG. 4B, the peak 460 that represents the pen input is larger and therefore easier to detect using threshold detection than the pen input 420 shown in FIG. 4A. Threshold detection will therefore work much better after the delta image is processed. In addition, separate image processing to remove the bending of the sensor is not necessary in this embodiment.

Figure 5A:
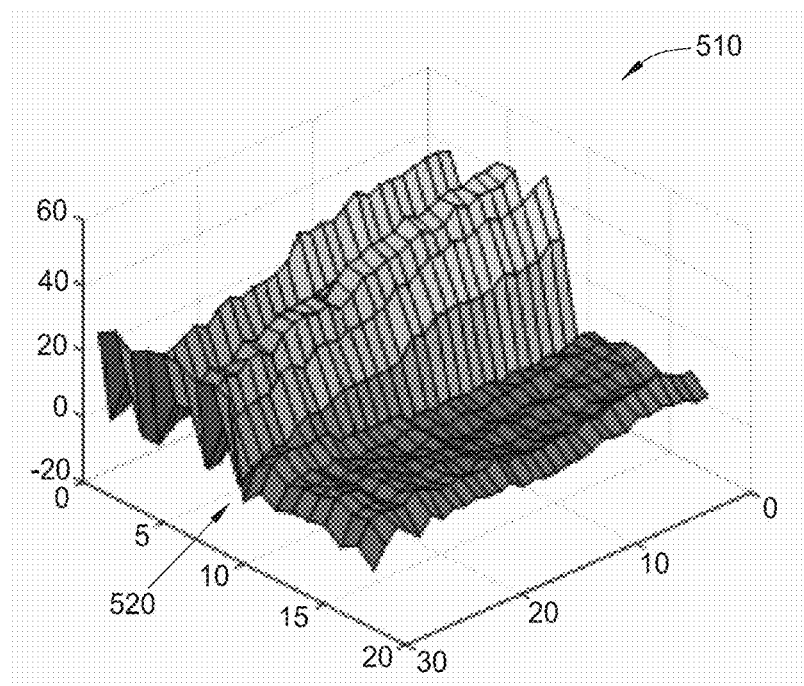
FIG. 5A illustrates another delta transcapacitive image with a pen input.
Figure 5B:
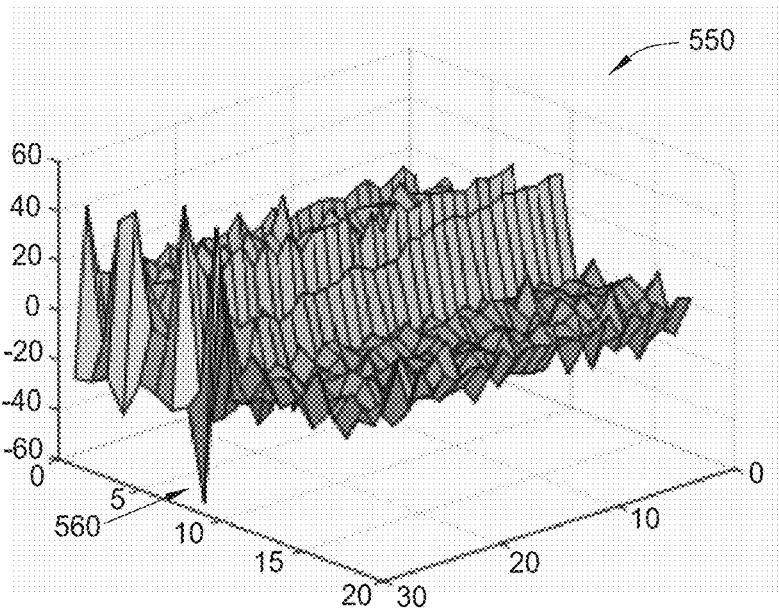
FIG. 5B illustrates a Laplacian of the delta transcapacitive image of FIG. 5A.

FIG. 5A illustrates an example delta image 510 according to one embodiment. The delta image illustrated is the result of a touch input at the touch sensor. While FIGS. 4A and 4B illustrated bending, FIGS. 5A and 5B illustrate baseline shifting. In FIG. 5A, the baseline image includes inputs at pixels that are higher than the actual pixels that were touched by a pen input. The pen input 520 is shown in the figure. As seen, pen input 520 can be very hard to detect using threshold detection. Therefore, processing of the image is performed to compensate for the baseline.

FIG. 5B illustrates a filtered capacitive frame 550 created by calculating a second-order derivative (or Laplacian) of the delta image 510. The second-order derivative is a high pass spatial filter applied to the delta image. After this second-order derivative is performed, image processing is done to detect the touch inputs. As seen in FIG. 5B, the peak 560 that represents the pen input is larger and therefore easier to detect using threshold detection than the pen input 520 shown in FIG. 5A. Therefore in this example, threshold detection will work much better after the delta image is processed.

Figure 6:
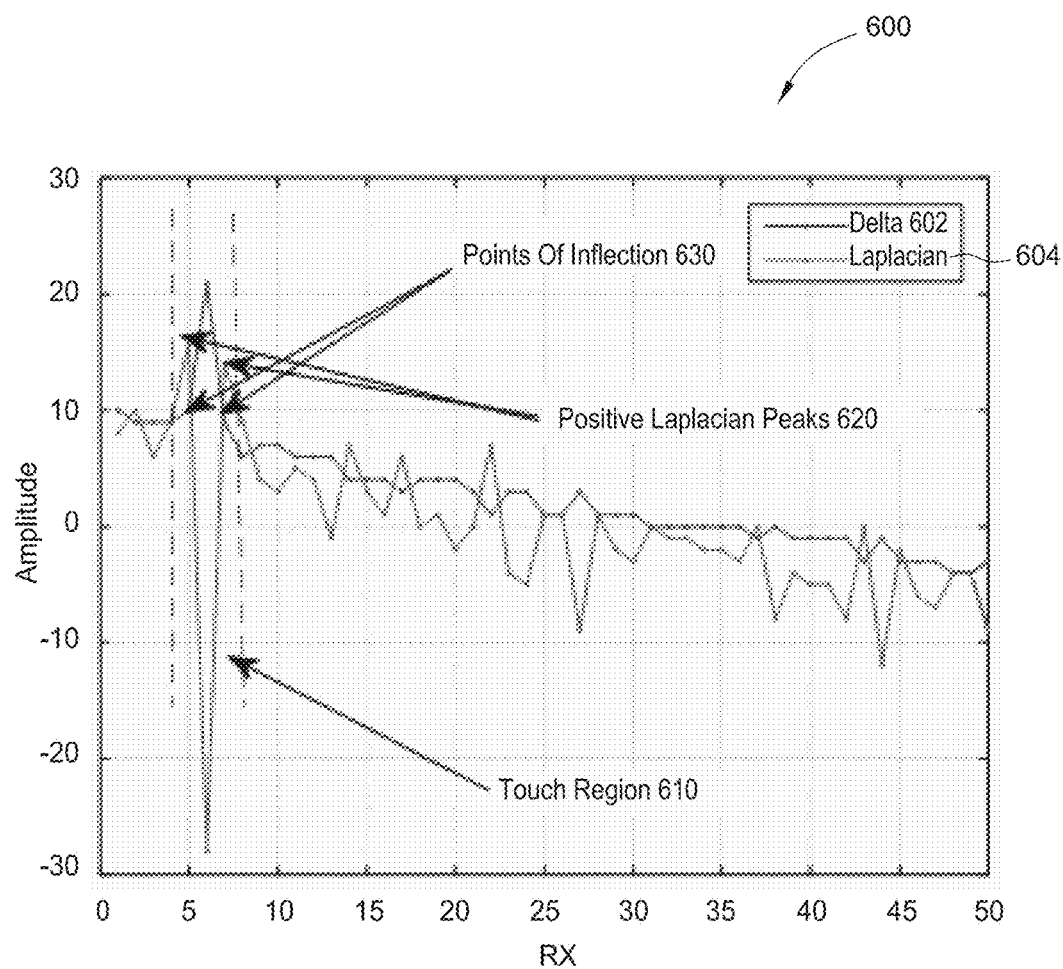
FIG. 6 illustrates a one-dimensional example of segmentation for a delta image row.

Filtered image frames, such as those illustrated in FIGS. 4B and 5B, are subjected to the segmentation and circumscribing process to detect touches. FIG. 6 illustrates a one-dimensional example of segmentation per delta image row. Two curves are illustrated in graph 600. First is the delta curve 602. Curve 602 illustrates the amplitude of the delta image. Curve 604 illustrates a Laplacian of the delta image. The curves can be analyzed by a segmentation module to detect touches.

The criteria for detection, in one example, are valleys that exceed a preset (negative) threshold in the filtered curve (illustrated here as touch region 610) that correspond to a positive touch peak in the original delta image, between the points of inflection 630 of the original delta image. Therefore, in this example, a touch is detected in touch region 610. Positive touch peaks in the neighborhood of the detected negative peak (such as positive Laplacian peaks 620) correspond to boundaries of clumps. Segmentation module 252 can perform this segmentation.

Figure 7:
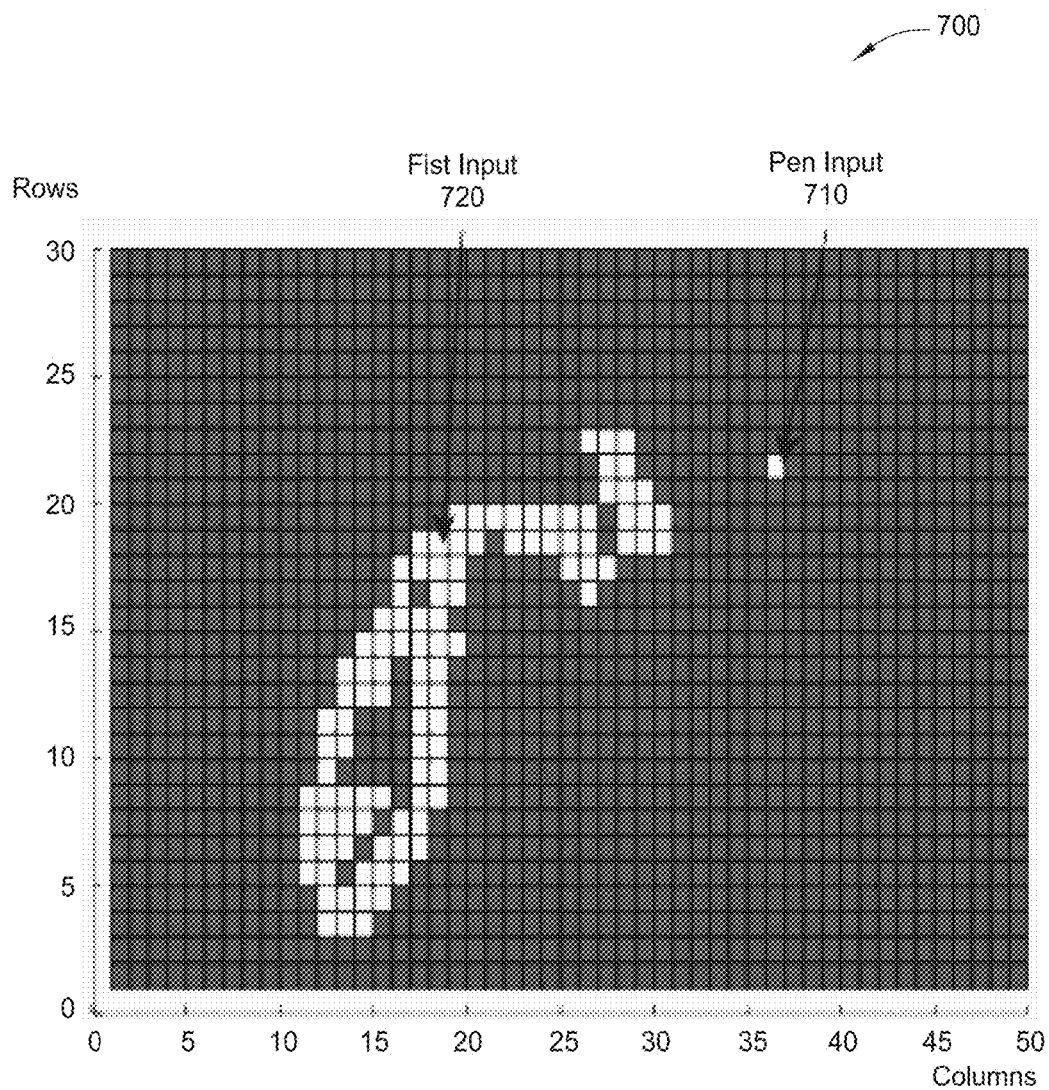
FIG. 7 illustrates an example top view of a touch sensor image after filtering.

FIG. 7 illustrates a view 700 of a clump labeled image with filtered detection. Rows and columns are illustrated on the x and y axes, respectively. FIG. 7 is created by combing multiple touch detections from the segmentation process as illustrated in FIG. 6. FIG. 7 illustrates a first input 720 and a pen input 710. These detected clumps can be passed to a classifier 254 for classification. The classifier 254 can differentiate the pen input from other inputs, for example. Compare FIG. 7 to FIG. 3, and it can be seen that the method described herein compensates for various errors. Compensating for these errors leads to more accurate segmentation and classification of touch inputs.

Figure 8:
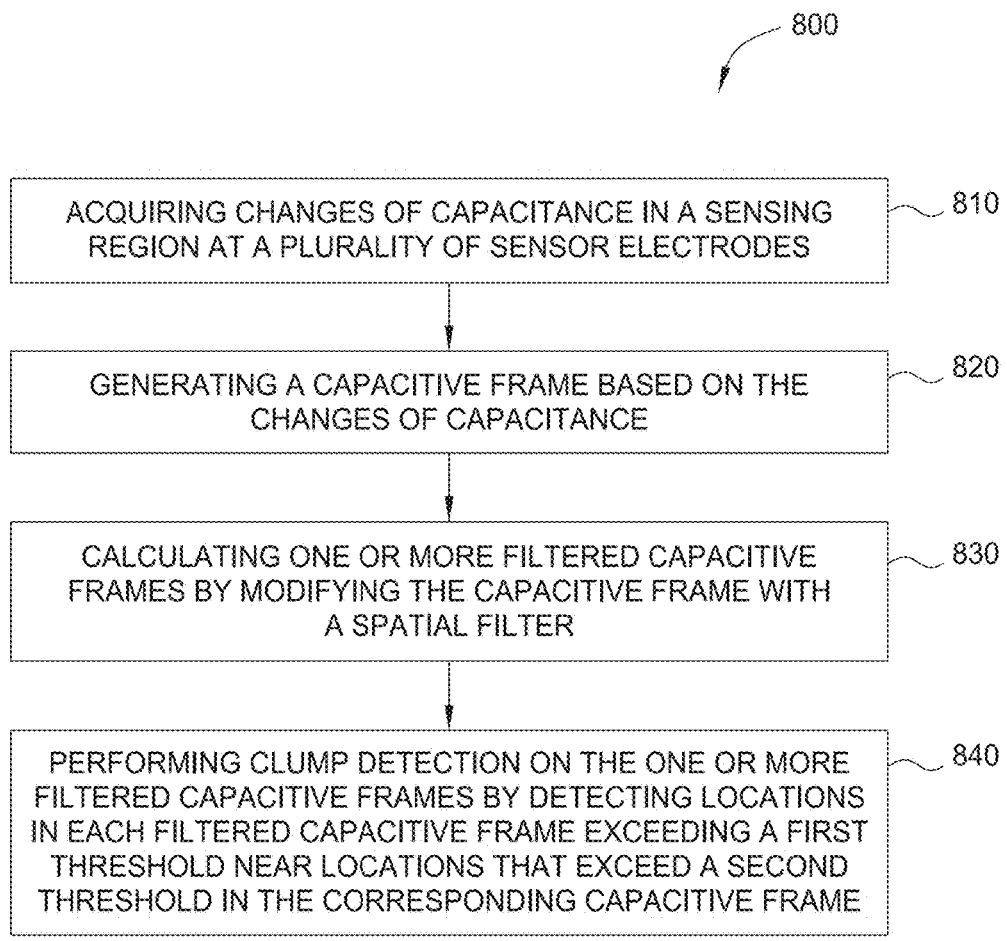
FIG. 8 is a flowchart illustrating a method for capacitive sensing with high pass filtering for segmentation.

FIG. 8 is a flow diagram illustrated a method 800 for capacitive sensing with filtering for segmentation. Although the method steps are described in conjunction with the systems of FIGS. 1-7, persons skilled in the art will understand that any system configured to perform the method steps, in any feasible order, falls within the scope of the present invention. In various embodiments, the hardware and/or software elements described above in FIGS. 1-7 can be configured to perform the method steps of FIG. 8. In some embodiments, the components illustrated in FIGS. 1-2, such as the sensor electrodes and AFE 270, may perform some or all of the steps in FIG. 8, utilizing hardware and/or software.

The method begins at step 810, where a plurality of sensor electrodes acquires changes of capacitance in a sensing region. The method proceeds to step 820, where a processing system generates a capacitive frame based on the changes of capacitance.

At step 830, the processing system calculates one or more filtered capacitive frames by modifying the capacitive frame with a spatial filter. At least one of the filtered capacitive frames is modified with a high pass spatial filter. Other filtered capacitive frames may be modified with a low pass spatial filter in some embodiments.

At step 840, a processing system performs clump detection on the one or more filtered capacitive frames. Clump detection comprises detecting locations in each filtered capacitive frame that exceed a first threshold near locations that exceed a second threshold in the corresponding capacitive frame.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. A method of input detection, comprising:
   detecting changes of capacitance in a sensing region of a capacitive sensor;
   generating a first capacitive frame based on the detected changes of capacitance;
   filtering the first capacitive frame using a high pass spatial filter to produce at least one filtered capacitive frame; and
   detecting an input in the sensing region coinciding with a location at which an amplitude of the at least one filtered capacitive frame exceeds a first threshold and an amplitude of the first capacitive frame exceeds a second threshold.

2. The method of claim 1, wherein the changes of capacitance are detected using transcapacitive sensing, and the first capacitive frame is a two-dimensional image.

3. The method of claim 1, wherein the changes of capacitance are detected using absolute capacitive sensing, and the first capacitive frame is a capacitive profile.

4. The method of claim 1, further comprising calculating low frequency noise by comparing two or more filtered capacitive frames.

5. The method of claim 1, further comprising calculating low frequency noise by comparing the first capacitive frame to one or more filtered capacitive frames.

6. The method of claim 1, further comprising determining a bending amount of the capacitive sensor based on comparing two capacitive frames.

7. The method of claim 1, wherein the high pass spatial filter comprises a first order derivative for an edge pixel of the capacitive sensor.

8. The method of claim 1, wherein the high pass spatial filter comprises a third order derivative for a non-edge pixel of the capacitive sensor.

9. An input device, comprising:
   a plurality of capacitive sensing electrodes configured to receive a signal; and
   a processing system coupled to the plurality of capacitive sensing electrodes, the processing system configured to:
      detect changes of capacitance in a sensing region associated with the plurality of capacitive sensing electrodes;
      generate a first capacitive frame based on the detected changes of capacitance;
      filter the first capacitive frame to produce at least one filtered capacitive frame; and
      detect an input in the sensing region coinciding with a location at which an amplitude of the at least one filtered capacitive frame exceeds a first threshold and an amplitude of the first capacitive frame exceeds a second threshold.

10. The input device of claim 9, wherein the processing system is to filter the first capacitive frame using a high pass spatial filter.

11. The input device of claim 10, wherein the high pass spatial filter comprises a first order derivative for an edge pixel of a capacitive sensor.

12. The input device of claim 10, wherein the high pass spatial filter comprises a third order derivative for a non-edge pixel of a capacitive sensor.

13. The input device of claim 9, wherein the processing system is to detect the changes of capacitance using transcapacitive sensing, and wherein the first capacitive frame is a two-dimensional image.

14. The input device of claim 9, wherein the processing system is to detect the changes of capacitance using absolute capacitive sensing, and wherein the first capacitive frame is a capacitive profile.

15. A processing system for capacitive sensing, comprising:
   a filter configured to filter a first capacitive frame to produce at least one filtered capacitive frame;
   a segmentation module configured to detect a location at which an amplitude of the at least one filtered capacitive frame exceeds a first threshold and an amplitude of the first capacitive frame exceeds a second threshold; and
   a classifier configured to classify an input associated with the detected location.

16. The processing system of claim 15, wherein the filter is a high pass spatial filter.

17. The processing system of claim 16, wherein the high pass spatial filter comprises a first order derivative for an edge pixel of a capacitive sensor.

18. The processing system of claim 16, wherein the high pass spatial filter comprises a third order derivative for a non-edge pixel of a capacitive sensor.

19. The processing system of claim 15, wherein the first capacitive frame is generated using transcapacitive sensing, and wherein the first capacitive frame is a two-dimensional image.

20. The processing system of claim 15, wherein the first capacitive frame is generated using absolute capacitive sensing, and wherein the first capacitive frame is a capacitive profile.

* * * * *